US012606732B2

(12) United States Patent　　　(10) Patent No.:　US 12,606,732 B2
Pearl, Jr. et al.　　　　　　　　　(45) Date of Patent:　　*Apr. 21, 2026

(54) ENHANCED CARBON SEQUESTRATION VIA FOAM CEMENTING

(71) Applicant: Halliburton Energy Services, Inc., Houston, TX (US)

(72) Inventors: William Cecil Pearl, Jr., Houston, TX (US); Samuel J. Lewis, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/515,803

(22) Filed: Nov. 21, 2023

(65) Prior Publication Data

US 2024/0101888 A1　　Mar. 28, 2024

Related U.S. Application Data

(62) Division of application No. 17/505,213, filed on Oct. 19, 2021, now Pat. No. 11,859,122.

(51) Int. Cl.
C09K 8/473　　　(2006.01)
C04B 38/10　　　(2006.01)
F25J 1/00　　　　(2006.01)

(52) U.S. Cl.
CPC ............ C09K 8/473 (2013.01); C04B 38/103 (2013.01); F25J 1/0027 (2013.01); *F25J 2230/32* (2013.01)

(58) Field of Classification Search
CPC ...... C09K 8/473; C04B 38/103; F25J 1/0027; F25J 2230/32
See application file for complete search history.

(56) References Cited

U.S. PATENT DOCUMENTS

| | | | |
|---|---|---|---|
| 5,518,540 A | 5/1996 | Jones, Jr. | |
| 6,264,736 B1 * | 7/2001 | Knopf ................. | C04B 40/0231 |
| | | | 106/738 |
| 7,390,444 B2 | 6/2008 | Ramme et al. | |
| 7,798,222 B2 | 9/2010 | Wilson | |
| 8,091,642 B2 | 1/2012 | Barlet-Gouedard et al. | |
| 9,028,607 B2 | 5/2015 | Ramme | |
| 9,233,485 B1 * | 1/2016 | Gurin ...................... | C04B 7/147 |

(Continued)

FOREIGN PATENT DOCUMENTS

| | | | |
|---|---|---|---|
| CN | 105064975 A | 11/2015 | |
| CN | 113733352 A | * 12/2021 | |

(Continued)

OTHER PUBLICATIONS

Translation of CN 113733352 A (Year: 2021).*

(Continued)

*Primary Examiner* — Angela M DiTrani Leff

(74) *Attorney, Agent, or Firm* — Conley Rose, P.C.; Rodney B. Carroll

(57)　　　　　　　ABSTRACT

A method including entraining carbon dioxide ($CO_2$) in a cement slurry composition and subjecting the cement slurry composition to conditions under which the $CO_2$ achieves and maintains a supercritical state; and allowing the cement slurry composition to harden to form a hardened cement having $CO_2$ sequestered therein.

20 Claims, 4 Drawing Sheets

1

SEPARATING CO₂ FROM GAS COMPRISING CO₂ (E.G., EXHAUST GAS, PRODUCED GAS, ETC.) — 101

COMPRESSING CO₂ — 102

ENTRAINING CARBON DIOXIDE (CO₂) IN CEMENT SLURRY COMPOSITION AND SUBJECTING CEMENT SLURRY COMPOSITION TO CONDITIONS UNDER WHICH THE CO₂ ACHIEVES AND MAINTAINS A SUPERCRITICAL STATE — 105

ALLOWING CEMENT SLURRY COMPOSITION TO HARDEN TO FORM A HARDENED CEMENT HAVING CO₂ SEQUESTERED THEREIN — 110

(56) References Cited

U.S. PATENT DOCUMENTS

| | | | | |
|---|---|---|---|---|
| 9,309,161 | B2 | 4/2016 | Chen et al. | |
| 10,174,601 | B2 | 1/2019 | Fu et al. | |
| 10,723,935 | B2 | 7/2020 | Jamison et al. | |
| 11,859,122 | B2 * | 1/2024 | Lewis | F25J 1/0027 |
| 2004/0214726 | A1 | 10/2004 | Tudor | |
| 2007/0284108 | A1 | 12/2007 | Roes et al. | |
| 2008/0028995 | A1 * | 2/2008 | Barlet-Gouedard | C09K 8/46 |
| | | | | 427/230 |
| 2008/0099200 | A1 * | 5/2008 | Wilson | E21B 43/025 |
| | | | | 166/276 |
| 2009/0126930 | A1 | 5/2009 | Barlet-Gouedard et al. | |
| 2015/0211330 | A1 | 7/2015 | Daou et al. | |
| 2016/0265306 | A1 | 9/2016 | Nelson | |
| 2021/0163360 | A1 * | 6/2021 | Clausen | C09K 8/467 |
| 2022/0162129 | A1 * | 5/2022 | Diggins | B28C 5/388 |

FOREIGN PATENT DOCUMENTS

| | | | | | |
|---|---|---|---|---|---|
| CN | 113733352 | B | | 12/2021 | |
| GB | 2437280 | A | | 10/2007 | |
| JP | 2000203964 | A | * | 7/2000 | C04B 28/00 |
| JP | 2006213559 | A | * | 8/2006 | H04N 7/0112 |
| WO | WO-2008027506 | A2 | * | 3/2008 | B65G 5/00 |
| WO | 2011049996 | A1 | | 4/2011 | |
| WO | 2016061251 | A1 | | 4/2016 | |
| WO | WO-2020206011 | A1 | * | 10/2020 | C04B 28/188 |

OTHER PUBLICATIONS

Virtual Museum of Minerals and Molecules, Portlandite, retrieved Oct. 9, 2024 from https://virtual-museum.soils.wisc.edu/display/portlandite/ (Year: 1956).*

Translation of JP-2006213559 A (Year: 2006).*

Translation of JP 2000203964 A (Year: 2000).*

Foreign Communication from Related Application—International Search Report and Written Opinion of the International Searching Authority, International Application No. PCT/US2022/040038, dated Nov. 23, 2022, 9 pages.

Li, Zhuguo, "Carbon Dioxide Sequestration in Foamed Concrete," Journal of Structural and Construction Engineering, Mar. 2016, vol. 81, No. 721, pp. 405-414, Architectural Institute of Japan.

Liu, Min et al., "Carbon Dioxide Curing of Foam Concrete with Different Bulk Densities," Advanced Materials Research, Oct. 2012, vols. 374-377, pp. 1764-1769, Trans Tech Publications.

Ravikumar, Dwarakanath et al., "Carbon Dioxide Utilization in Concrete Curing or Mixing Might Not Produce a Net Climate Benefit," Nature Communications, 2021, vol. 12, No. 855, 13 pages, Nature Publishing Group.

How Far Do We Drill to Find Oil, Nov. 5, 2014 Petro Online, retrieved Nov. 2, 2022 from https;//www.petro-online.com/news/fuel-for-thought/13/breaking-news/how-far-do-we-drill-to-find-oil/32357 (year: 2014).

* cited by examiner

ENHANCED CARBON SEQUESTRATION VIA FOAM CEMENTING

CROSS-REFERENCE TO RELATED APPLICATIONS

The present application is a divisional of and claims priority to U.S. patent application Ser. No. 17/505,213 filed Oct. 19, 2021, published as U.S. Patent Application Publication No. 2023/0118904 A1, entitled "Enhanced Carbon Sequestration via Foam Cementing," which is hereby incorporated by reference in its entirety.

STATEMENT REGARDING FEDERALLY SPONSORED RESEARCH OR DEVELOPMENT

Not applicable.

TECHNICAL FIELD

The present disclosure relates generally to wellbore cementing. More specifically, the present disclosure relates to carbon sequestration via wellbore cementing. Still more specifically, the present disclosure relates to sequestration of carbon dioxide via formation of a cement slurry composition comprising supercritical carbon dioxide.

BACKGROUND

In cementing operations, such as well construction and remedial cementing, cement slurry compositions are commonly utilized. Cement slurry compositions may be used in primary cementing operations whereby pipe strings, such as casing and liners, are cemented in wellbores. In a typical primary cementing operation, a cement slurry composition may be pumped into an annulus between the exterior surface of the pipe string disposed therein and the walls of the wellbore (or a larger conduit in the wellbore). The cement slurry composition may set in the annular space, thereby forming an annular sheath of hardened, substantially impermeable material (e.g., a cement sheath) that may support and position the pipe string in the well bore and may bond the exterior surface of the pipe string to the wellbore walls (or the larger conduit). Among other things, the cement sheath surrounding the pipe string should function to prevent the migration of fluids in the annulus, as well as protecting the pipe string from corrosion. Cement slurry compositions also may be used in remedial cementing methods, such as in squeeze cementing for sealing voids in a pipe string, cement sheath, gravel pack, subterranean formation, and the like.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods can be implemented using any number of techniques, whether currently known or in existence. The disclosure should in no way be limited to the illustrative implementations, drawings, and techniques below, including the exemplary designs and implementations illustrated and described herein, but can be modified within the scope of the appended claims along with their full scope of equivalents.

Disclosed herein are settable compositions (e.g., cement compositions) and methods for carbon sequestration utilizing such settable compositions. In embodiments, the settable compositions comprise cement compositions (also referred to herein as "cement slurry compositions"), resins, or other hardenable materials. Although intended to include cement compositions, resins, and other hardenable materials, for simplicity, such settable compositions will be referred to herein simply as "cement compositions" or "cement slurry compositions". It is to be understood that, although described hereinbelow with reference to typical Portland style hydraulic cements, other settable materials, such as, without limitation, sorel cements, resins, etc., are intended to be within the scope of this disclosure.

Figures 1, 2:
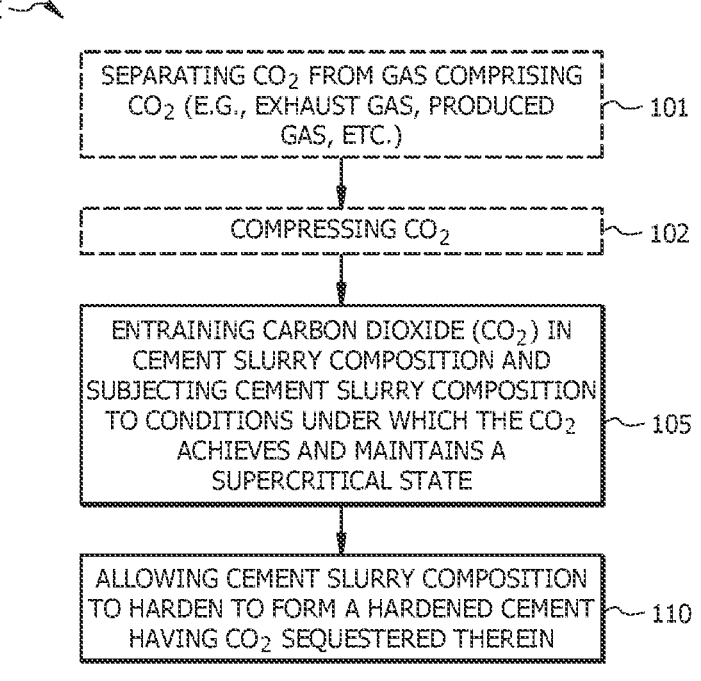
FIG. 1 is a schematic flow diagram of a method, according to embodiments of this disclosure.
FIG. 2 is a schematic flow diagram of a method, according to embodiments of this disclosure.

Description of a method of according to this disclosure will now be made with reference to FIG. 1, which is a schematic flow diagram of a method I. As seen in FIG. 1, in embodiments, a method I of this disclosure can comprise, as indicated at step 105, entraining carbon dioxide ($CO_2$) in a cement slurry composition and subjecting the cement slurry composition to conditions under which the $CO_2$ achieves and maintains a supercritical state; and, as indicated at step 110, allowing the cement slurry composition to harden to form a hardened cement having $CO_2$ sequestered therein. Method I can further include separating $CO_2$ from a gas comprising $CO_2$ (e.g., an exhaust gas, produced gas, etc.), as indicated at step 101, and/or compressing the $CO_2$, as indicated at step 102.

Figure 6:
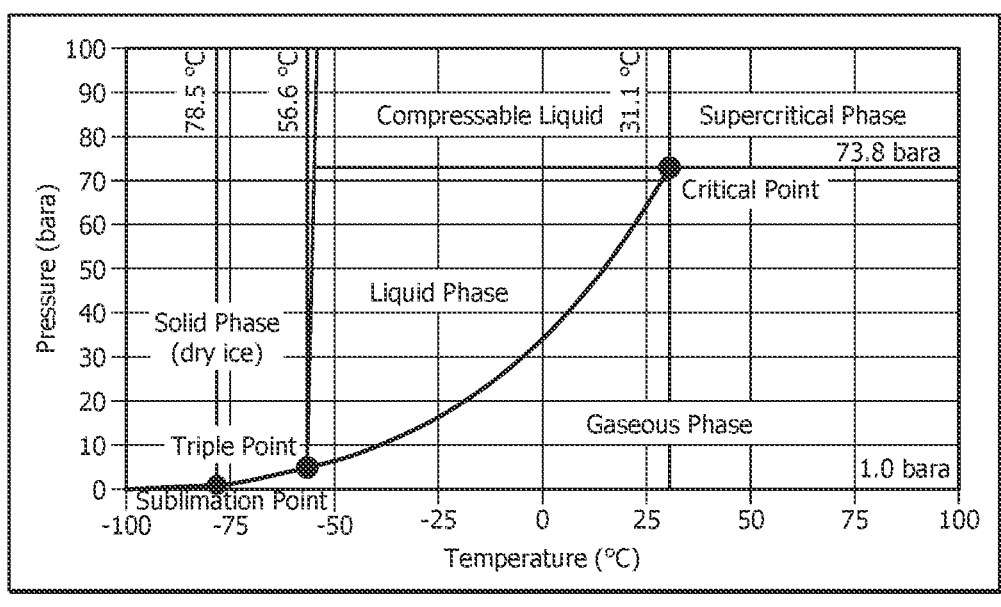
FIG. 6 is a phase diagram for carbon dioxide ($CO_2$)

As noted above, method I comprises, at step 105, entraining carbon dioxide ($CO_2$) in a cement slurry composition and subjecting the cement slurry composition to conditions under which the $CO_2$ achieves and maintains a supercritical state. The conditions under which the $CO_2$ achieves and maintains a supercritical state can generally comprise a temperature of greater than about 87.8° F. (31° C.) and/or a pressure of greater than or equal to about 1070 psi (7.3 MPa). A $CO_2$ phase diagram, such as depicted in FIG. 6, can be utilized to determine conditions at which $CO_2$ is supercritical. The $CO_2$ becomes and remains supercritical when the conditions exceed and remain above the critical point (i.e., 31.1° C. and 73.8 bar) as illustrated by the phase diagram of FIG. 6. In embodiments the $CO_2$ can be combined with the other cement slurry components (e.g., injected into a cement slurry composition as described herein) as a liquid, and introduced downhole. As the cement slurry composition is positioned downhole it will get warmer and experience an increase in pressure, such that the $CO_2$ becomes supercritical. Alternatively, in embodiments, parameters can be adjusted to introduced the $CO_2$ into the cement slurry composition as gas or supercritical at the surface. As the conditions will not reduce below the critical point during placement of the cement slurry composition downhole, the $CO_2$ can remain supercritical. The supercritical $CO_2$ remains entrapped in the hardened cement after the cement slurry composition hardens. Without being limited by theory, chemical absorption can assist in this process by decreasing the permeability of the system. The increased pressure (i.e., having the $CO_2$ achieve and maintain the supercritical state) allows for a greatly increased mass of $CO_2$ per unit volume of hardened cement than possible via conventional techniques. By introducing the cement slurry composition comprising the entrained $CO_2$ downhole, a density change can be effected, as described further in the Example below.

In embodiments, subjecting the cement slurry composition to conditions under which the $CO_2$ achieves and maintains a supercritical state at step 105 comprises positioning the cement slurry composition downhole at a wellsite. In embodiments, step 105 of entraining $CO_2$ in the cement slurry composition under conditions whereby the $CO_2$ reaches the supercritical state can comprise: combining liquid $CO_2$ with the cement slurry composition and compressing such that the $CO_2$ becomes supercritical $CO_2$. Alternatively or additionally, entraining $CO_2$ in the cement slurry composition under conditions whereby the $CO_2$ reaches the supercritical state can comprise combining supercritical $CO_2$ with the cement slurry composition. Compressing such that the $CO_2$ becomes supercritical $CO_2$ can occur when the cement slurry composition and the liquid $CO_2$ are placed downhole, whereby downhole pressure and temperature cause the liquid $CO_2$ to become the supercritical $CO_2$.

Entraining the $CO_2$ in the cement slurry composition under conditions whereby the $CO_2$ achieves the supercritical state, in step 105, can comprise combining a fluid stream comprising $CO_2$ with the cement slurry composition. The fluid stream can comprise liquid or gaseous $CO_2$. The fluid stream can comprise $CO_2$ produced at a jobsite at which the method is performed and/or at another jobsite. For example, in embodiments, the fluid stream comprises all or a portion (e.g., one or more components) of an exhaust gas (also referred to as a "flue gas"), a produced gas, methane, or a combination thereof, optionally produced at the jobsite (e.g., a wellsite). The exhaust gas can be a product of combustion of a fuel, such as, natural gas, gasoline (petrol), diesel fuel, fuel oil, biodiesel, coal, or a combination thereof. In addition to $CO_2$, the exhaust gas can comprise nitrogen ($N_2$), carbon monoxide (CO), hydrogen sulfide ($H_2S$), water vapor, hydrocarbons $C_xH_y$ (or "HC"), nitrogen oxides ($NO_x$), particulate matter (soot), or a combination thereof.

Method I can further comprise separating $CO_2$ gas from gas comprising $CO_2$ (e.g., exhaust gas, produced gas, etc.), as indicated at step 101. As depicted at step 102, method I can further comprise compressing the (e.g., separated) $CO_2$ gas, e.g., to provide liquid or the supercritical $CO_2$. The compressing at step 102 can be effected with hydrocarbons (e.g., wellhead gas) recovered or produced at the or another jobsite (e.g., wellsite). For example, and without limitation, in embodiments, rather than flaring wellhead gas, the wellhead gas is utilized to run a compressor for the compressing at step 102.

At step 110, allowing the cement slurry composition to harden to form a hardened cement having $CO_2$ sequestered therein can comprise positioning or leaving the cement slurry composition downhole, for example as described hereinbelow with reference to FIG. 3, FIG. 4, and FIG. 5.

In embodiments, the cement slurry composition further comprises methane. The methane can be incorporated into the cement slurry composition as a component of another gas (e.g., exhaust gas, produced gas) or separately. For example, the method I can further comprise capturing methane in a wellhead gas and incorporating the methane gas into the cement slurry composition.

The cement slurry composition, the hardened cement, or both can contain therein from about 5 to about 60, from about 40 to about 50, from about 45 to about 50, and/or greater than or equal to about 5, 10, 15, 20, 25, 30, 35, 40, 45, 50, 55, or 60 vol % $CO_2$ at the conditions under which the $CO_2$ achieves and/or maintains the supercritical state. In embodiments, the hardened cement comprises from about 1, 5, 10, 50, 100, 150, or 200 to about 50, 100, 150, 200, 250, 300, 350, 400, 450, 500, 550, 600, 650, 700 kg $CO_2$ per $m^3$ of hardened cement, and/or greater than or equal to about 1, 5, 10, 50, 100, 150, 200, 250, 300, 350, 400, 450, 500, 550, 600, 650, 700, or more kg $CO_2$ per $m^3$ of hardened cement.

In embodiments, the cement slurry composition is a foamed cement slurry comprising a base slurry, one or more foaming agents, one or more foam stabilizers, one or more additional cement components (e.g., cementitious materials or additives, as described further hereinbelow), or a combination thereof. As utilized herein, 'foamed' includes the supercritical fluid regime. In some such embodiments, a method of this disclosure, which will now be described with reference to FIG. 2, which is a schematic flow diagram of a Method II of this disclosure, can comprise forming a foamed cement composition comprising carbon dioxide ($CO_2$), wherein the $CO_2$ is in a supercritical state, as indicated at step 205; and allowing the foamed cement composition to cure under conditions at which the $CO_2$ remains supercritical, to provide a hardened cement, at step 210.

Forming the foamed cement composition at step 205 can comprise adding to a base cement slurry: (i) non-supercritical $CO_2$ (e.g., gaseous $CO_2$) and/or (ii) a non-$CO_2$ foaming agent (e.g., another gas). Forming the foamed cement composition at step 205 can comprise adding liquid $CO_2$ to the base cement slurry and reducing the pressure to obtain gaseous $CO_2$ to provide the foamed cement composition, and increasing the pressure (e.g., to a pressure at which the $CO_2$ becomes supercritical (e.g., a pressure of greater than or equal to 1070 psi) to convert remaining $CO_2$ in the foamed cement composition to supercritical. Increasing the pressure to the pressure at which the $CO_2$ becomes supercritical can comprise compressing with a compressor or introducing the foamed slurry composition downhole, whereby the foamed cement composition is subjected to downhole pressures (e.g., downhole pressures of greater than or equal to about 1070, 2000, or 3000 psi).

Allowing the foamed cement composition to cure under the conditions at which the $CO_2$ remains supercritical at step 210 can comprise positioning or leaving the foamed cement composition downhole. The conditions at which the $CO_2$ becomes supercritical can comprise a temperature of greater than or equal to about 87.8° F. (31° C.) and/or a pressure of greater than or equal to about 1070 psi (7.39 MPa). As noted hereinabove, the foamed cement composition and/or the hardened cement can contain therein from about 5 to about 60, from about 40 to about 50, from about 45 to about 50, and/or greater than or equal to about 5, 10, 15, 20, 25, 30, 35, 40, 45, 50, 55, or 60 vol % $CO_2$ therein at the conditions under which the $CO_2$ becomes supercritical.

The cement slurry composition (e.g., foamed cement composition) can further comprise water and one or more additional cement components. Exemplary such additional cement components and amounts of the water and one or more additional components will be described hereinbelow. Although a variety of cementitious materials and additives are described hereinbelow, cementitious materials and cement additives other than or in addition to those described herein can be utilized in the cement slurry composition according to this disclosure.

A design consideration for a cement slurry composition may be slurry density. Providing a cement slurry composition with a density within a safe operational envelope may be important to ensure that the set cement provides effective zonal isolation. Most subterranean formations may have an upper density limit defined by the fracture gradient of the subterranean formation. If a cement has a high density whereby the pressure of the cement column on the subterranean formation exceeds the fracture gradient, the cement may cause the formation to fracture, leading to loss of cement and potential formation damage. Even if the cement does not fracture the formation, providing a cement with too high density may cause cement to leak off into the formation which may lead to formation damage and additional cost of cement to "make up" the cement lost. However, a lower density limit may be defined by the formation fluid pressure at the wellbore walls, for example. The cement slurry composition generally must have sufficient density to minimize or prevent formation fluids from entering the wellbore before the cement has set. Without sufficient density, the formation fluids may flow into the cement column which may weaken the cement.

Slurry density may be controlled by adjusting the amount of water in the cement slurry composition. For example, a cement may be produced with relatively higher amounts of water if a lower density cement is desired or relatively lower amounts of water if a higher density cement is desired. The slurry may also include lightweight cement additives such as hollow beads or other relatively low-density additives that may aid in lowering density or heavy cement additives such as weighting agents or other relatively high-density additives which may increase density. However, adjusting cement density by changing water content or adding cement additives may affect other properties of the cement slurry composition such as compressive strength, thickening time, rheology, fluid loss, free fluid, and fluid stability, among others. Furthermore, some additives may be incompatible with each other or require excessive water to hydrate.

A cement slurry composition generally should have a water content that does not result in undesirable free water or separation of water from the bulk cement slurry composition. Free water may be an aqueous phase that separates from a slurry or mixture of fluids. In cementing operations, free water is generally undesirable since channels can form through the set cement, providing potential gas migration paths. When processing reservoir fluids, the water that separates easily under gravity separation is known as free water. In some cases, additional water may be locked in an emulsion, contributing to the aqueous phase but not available as free water. API RP 10B-2, *Recommended Practice for Testing Well Cements*, First Edition, July 2005 provides methods to determine free water for a cement slurry composition. Free water may cause problems in wellbore cementing, especially in deviated wellbores such as horizontal wellbores. Water that separates from the bulk cement slurry composition may migrate to the top of a conduit to be cemented resulting in pockets where the cement slurry composition is not in contact with the subterranean formation. These pockets of free water may cause problems such as loss of zonal isolation, conduit corrosion, wellbore collapse, and other problems. It is therefore typically preferred that cement slurry compositions have little to no free water present in the set composition.

A common and inexpensive method to decrease cement slurry composition density may be to add additional water during preparation of the cement slurry composition as water is typically less dense than other components in the cement slurry composition. The additional water may allow the cement slurry composition to be prepared to lower densities but may also result in free water separating from the cement slurry composition as the cement slurry composition is introduced into a wellbore and allowed to set.

The water in the cement slurry composition can be from any source provided that it does not contain an excess of compounds that may undesirably affect other components in the cement slurry composition. For example, a cement slurry composition may include fresh water, salt water such as brine (e.g., saturated saltwater produced from subterranean formations) or seawater, or any combination thereof. Salt water generally may include one or more dissolved salts therein and may be saturated or unsaturated as desired for a particular application. Seawater or brines may be suitable for use in some examples of the cement slurry composition. Further, the water may be present in an amount sufficient to form a pumpable slurry. Generally, the water may be added to the cement slurry composition in any desired concentration, including at a point in a range of from about 30 10% to about 80% by weight of the cement slurry composition. Alternatively, the water may be present in the cement slurry composition at a point in a range of from an amount of about 10% to about 30% by weight of the cement slurry composition, at a point in a range of from about 30% to about 50% by weight of the cement slurry composition, at a point in a range of from about 50% to about 60% by weight of the cement slurry composition, at a point in a range of from about 60% to about 70% by weight of the cement slurry composition, at a point in a range of from about 70% to about 80% by weight of the cement slurry composition or any points therebetween.

The cement slurry composition can have a density suitable for a particular application. By way of example, the cement slurry composition may have a density at a point in a range of from about 4 pounds per gallon ("lb/gal") (479 $kg/m^3$) to about 20 lb/gal (2396 $kg/m^3$). Alternatively, the cement slurry composition may have a density at a point in a range of from about 4 lb/gal (479 $kg/m^3$) to about 7 lb/gal (839 $kg/m^3$), at a point in a range of from about 7 lb/gal (839 $kg/m^3$) to about 10 (1198 $kg/m^3$), at a point in a range of from about 10 lb/gal (1198 $kg/m^3$) to about 13 lb/gal (1558 $kg/m^3$), at a point in a range of from about 13 lb/gal (1558 $kg/m^3$), to about 16 lb/gal (1917 $kg/m^3$), at a point in a range of from about 16 lb/gal (1917 $kg/m^3$) to about 20 lb/gal (2396 $kg/m^3$), or any points therebetween. As discussed above, the density of cement may be an important design factor as the density range of cement may be limited by the formation properties. As mentioned hereinabove, one method to control density may be to increase the fraction of water included in the cement slurry composition. However, increasing water fraction generally leads to a cement with a lower compressive strength and increased free water which may be unsuitable for some applications.

The cement slurry composition may include hydraulic cement. In some instances, the hydraulic cement may be included in the cement slurry composition as a source of hydroxide ions. Any of a variety of hydraulic cements may be suitable including those including calcium, aluminum, silicon, oxygen, iron, and/or sulfur, which set and harden by reaction with water. Specific examples of hydraulic cements that may be suitable include, but are not limited to, Portland cements, pozzolana cements, gypsum cements, alumina based cements, silica cements, and any combination thereof. Examples of suitable Portland cements may include those classified as Classes A, B, C, G, or H cements according to American Petroleum Institute, API Specification for Materials and Testing for Well Cements, API Specification 10, Fifth Ed., Jul. 1, 1990. Additional examples of suitable Portland cements may include those classified as ASTM Type I, II, III, IV, or V.

The hydraulic cement may be included in the cement slurry composition in an amount (or concentration). The amount of the hydraulic cement may be selected, for example, to provide a particular compressive strength for the cement slurry composition after setting (i.e., the hardened cement). Where used, the hydraulic cement may be included in an amount in a range of from about 1% to about 80% by weight of the cement slurry composition. By way of example, the hydraulic cement may be present in an amount ranging between any of and/or including any of about 1%, about 5%, about 10%, about 20%, about 30%, about 40%, about 50%, about 60%, about 70%, or about 80% by weight of the cement slurry composition. In embodiments, the hydraulic cement may be present in an amount in a range of from about 25% to about 75% by weight of the cement slurry composition and, alternatively, from about 40% to 60% by weight of the cement slurry composition.

In some examples, the cement slurry composition may further include a lightweight additive. The lightweight additive may be included to reduce the density of examples of the cement slurry composition. For example, the lightweight additive may be used to form a lightweight cement slurry composition, for example, having a density of less than about 13 lb/gal (1558 kg/m³). The lightweight additive typically may have a specific gravity of less than about 2.0. Examples of suitable lightweight additives may include sodium silicate, hollow microspheres, gilsonite, perlite, and combinations thereof. Where used, the lightweight additive may be present in an amount in the range of from about 0.1% to about 20% by weight of the cement slurry composition, for example. In alternative examples, the lightweight additive may be present in an amount in the range of from about 1% to about 10% by weight of the cement slurry composition.

In some examples, as noted above, the cement slurry composition is foamed. In such embodiments, the cement slurry composition can include a foaming agent, and a gas (e.g., $CO_2$). Optionally, to provide a cement slurry composition with a lower density and more stable foam, the foamed cement composition may further comprise a lightweight additive, for example. With the lightweight additive, a base slurry may be prepared that may then be foamed to provide an even lower density. In some embodiments, the foamed cement composition may have a density in the range of from about 4 lb/gal (479 kg/m³) to about 13 lb/gal (1558 kg/m³) and, alternatively, about 7 lb/gal (839 kg/m³) to about 9 lb/gal (1078 kg/m³). In embodiments, a base slurry may be foamed from a density of in the range of from about 9 lb/gal (1078 kg/m³) to about 13 lb/gal (1558 kg/m³) to a lower density, for example, in a range of from about 7 lb/gal (839 kg/m³) to about 9 lb/gal (1078 kg/m³).

The gas used in embodiments of the foamed cement composition may be any suitable gas for foaming the cement composition, including, but not limited to $CO_2$, air, nitrogen, and combinations thereof. Generally, the gas should be present in examples of the foamed cement composition in an amount sufficient to form the desired foam. In certain embodiments, the gas may be present in an amount in the range of from about 5% to about 80% by volume of the cement slurry composition at atmospheric pressure, alternatively, about 5% to about 55% by volume, and, alternatively, about 15% to about 30% by volume.

Where foamed, examples of the cement slurry composition may include a foaming agent for providing a suitable foam. As used herein, the term "foaming agent" refers to a material or combination of materials that facilitate the formation of a foam in a liquid. Any suitable foaming agent for forming a foam in an aqueous liquid may be used in embodiments of the cement slurry composition. Examples of suitable foaming agents may include, but are not limited to: anionic, nonionic, amphoteric (including zwitterionic surfactants), cationic surfactant, or mixtures thereof, betaines; anionic surfactants such as hydrolyzed keratin; amine oxides such as alkyl or alkene dimethyl amine oxides; cocoamidopropyl dimethylamine oxide; methyl ester sulfonates; alkyl or alkene amidobetaines such as cocoamidopropyl betaine; alpha-olefin sulfonates; quaternary surfactants such as trimethyltallowammonium chloride and trimethylcocoammonium chloride; C8 to C22 alkylethoxylate sulfates; and combinations thereof. Specific examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant, mixtures of an ammonium salt of an alkyl ether sulfate, and combinations thereof. Generally, the foaming agent may be present in embodiments of the cement slurry composition fluids in an amount sufficient to provide a suitable foam. In some embodiments, the foaming agent may be present in an amount in the range of from about 0.8% to about 5% by volume of the water ("bvow").

The cement slurry compositions may further include a pozzolan composition, such as fly ash, silica fume, metakaolin, volcanic glasses, other natural glasses or combinations thereof, for example, to prevent cement compressive. An example of a suitable pozzolan may include fly ash. An additional example of a suitable pozzolan may include a natural pozzolan. Natural pozzolans are generally present on the Earth's surface and set and harden in the presence of hydrated lime and water. Examples including of natural pozzolans may include natural glasses, diatomaceous earth, volcanic ash, opaline shale, tuff, and combinations thereof. The cement slurry composition can include fly ash. A variety of fly ashes may be suitable, including fly ash classified as Class C or Class F fly ash according to American Petroleum Institute, ASTM C618-15, "Standard Specification for Coal Fly Ash and Raw or Calcined Natural Pozzolan for Use in Concrete" published 2015. Where used, the fly ash generally may be included in the cement slurry composition in an amount desired for a particular application. In some examples, the fly ash may be present in the cement slurry composition in an amount in the range of from about 1% to about 60% by weight of the cement slurry composition (e.g., about 5%, about 10%, about 15%, about 20%, about 25%, about 30%, about 35%, about 40%, about 45%, about 50%, about 55%, etc.). In some examples, the fly ash may be present in the cement slurry composition in an amount in the range of from about 1% to about 35% by weight of the cement slurry composition. In some examples, the fly ash may be present in the cement slurry composition in an amount in the range of from about 1% to about 10% by weight of the cement slurry composition. Alternatively, the amount of fly ash may be expressed by weight of dry solids. For example, the fly ash may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some examples, the fly ash may be present in an amount in the range of from about 1% to about 20% and, alternatively, from about 1% to about 10% by weight of dry solids.

The cement slurry composition may further include slag. Slag is generally a granulated, blast furnace by-product from the production of cast iron including the oxidized impurities found in iron ore. The slag may be included in examples of the cement slurry composition in an amount suitable for a particular application. Where used, the slag may be present in an amount in the range of from about 0.1% to about 40% by weight of the cement slurry composition. For example, the slag may be present in an amount ranging between any of and/or including any of about 0.1%, about 10%, about 20%, about 30%, or about 40% by weight of the cement slurry composition.

The cement slurry composition may further include shale in an amount sufficient to provide the desired compressive strength, density, and/or cost. A variety of shales are suitable, including those including silicon, aluminum, calcium, and/or magnesium. Examples of suitable shales include vitrified shale and/or calcined shale. Where used, the shale may be present in an amount in the range of from about 0.1% to about 40% by weight of the cement slurry composition. For example, the shale may be present in an amount ranging between any of and/or including any of about 0.1%, about 10%, about 20%, about 30%, or about 40% by weight of the cement slurry composition.

Some examples of the cement slurry compositions may include silica sources; for example, crystalline silica and/or amorphous silica. Crystalline silica is a powder that may be included in examples of the cement slurry composition, for example, to prevent cement compressive strength retrogression. Amorphous silica is a powder that may be included in examples of the cement slurry composition as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. Examples including a silica source may utilize the silica source as needed to enhance compressive strength or set times.

The cement slurry composition may further include kiln dust. "Kiln dust," as that term is used herein, refers to a solid material generated as a by-product of the heating of certain materials in kilns. The term "kiln dust" as used herein is intended to include kiln dust made as described herein and equivalent forms of kiln dust. In some instances, the kiln dust may be included in the cement slurry composition as a source of hydroxide ions. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. Problems may also be associated with the disposal of lime kiln dust, which may be generated as a by-product of the calcination of lime. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. In some examples, the kiln dust may be present in the cement slurry composition in an amount in the range of from about 1% to about 60% by weight of the cement slurry composition (e.g., about 5%, about 10%, about 15%, about 20%, about 25%, about 30%, about 35%, about 40%, about 45%, about 50%, about 55%, etc.). In some examples, the fly ash may be present in the cement slurry composition in an amount in the range of from about 1% to about 35% by weight of the cement slurry composition. In some examples, the fly ash may be present in the cement slurry composition in an amount in the range of from about 1% to about 10% by weight of the cement slurry composition. Alternatively, the amount of fly ash may be expressed by weight of dry solids. For example, the fly ash may be present in an amount in a range of from about 1% to about 99% by weight of dry solids (e.g., about 1%, about 5%, about 10%, about 20%, about 30%, about 40%, about 50%, about 60%, about 70%, about 80%, about 90%, about 99%, etc.). In some examples, the fly ash may be present in an amount in the range of from about 1% to about 20% and, alternatively, from about 1% to about 10% by weight of dry solids.

The cement slurry composition may further include a set retarder. A broad variety of set retarders may be suitable for use in the cement slurry composition. For example, the set retarder may include phosphonic acids, such as ethylenediamine tetra(methylene phosphonic acid), diethylenetriamine Penta(methylene phosphonic acid), lignosulfonates, such as sodium lignosulfonate, calcium lignosulfonate, salts such as stannous sulfate, lead acetate, monobasic calcium phosphate, organic acids, such as citric acid, tartaric acid, cellulose derivatives such as hydroxyl ethyl cellulose (HEC) and carboxymethyl hydroxyethyl cellulose (CMHEC), synthetic co- or ter-polymers including sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. Generally, the set retarder may be present in the cement slurry composition in an amount sufficient to delay the setting for a desired time. In some examples, the set retarder may be present in the cement slurry composition in an amount in the range of from about 0.01% to about 10% by weight of the cement slurry composition. In specific examples, the set retarder may be present in an amount ranging between any of and/or including any of about 0.01%, about 0.1%, about 1%, about 2%, about 4%, about 6%, about 8%, or about 10% by weight of the cement slurry composition.

The cement slurry composition may further include a set accelerator. Set accelerators may be included in the cement slurry compositions to, for example, increase the rate of setting reactions. Control of setting time may allow for the ability to adjust to wellbore conditions or customize set times for individual jobs. Examples of suitable set accelerators may include, but are not limited to, aluminum sulfate, alums, calcium chloride, calcium sulfate, gyp sum-hemihydrate, sodium aluminate, sodium carbonate, sodium chloride, sodium silicate, sodium sulfate, ferric chloride, or a combination thereof. In some examples, the set accelerator may be present in the cement slurry composition in an amount in the range of from about 0.01% to about 10% by weight of the cement slurry composition. In specific examples, the set accelerator may be present in an amount ranging between any of and/or including any of about 0.01%, about 0.1%, about 1%, about 2%, about 4%, about 6%, about 8%, or about 10% by weight of the cement slurry composition.

The cement slurry composition may further include a dispersant. Examples of suitable dispersants include, without limitation, sulfonated-formaldehyde-based dispersants (e.g., sulfonated acetone formaldehyde condensate) and polycarboxylated ether dispersants. In some examples, a dispersant may be included in the cement slurry compositions in an amount in the range of from about 0.01% to about 5% by weight of the cement slurry composition. In specific examples, the dispersant may be present in an amount ranging between any of and/or including any of about 0.01%, about 0.1%, about 0.5%, about 1%, about 2%, about 3%, about 4%, or about 5% by weight of the cement slurry composition.

The cement slurry composition may further include a free water control additive. As used herein, the term "free water control additive" refers to an additive included in a liquid for, among other things, reducing or preventing the presence of free water in the cement slurry composition. Free water control additive may also reduce or prevent the settling of solids. Examples of suitable free water control additives include, but are not limited to, bentonite, amorphous silica, hydroxyethyl cellulose, and combinations thereof. The free water control additive may be provided as a dry solid in some embodiments. Where used, the free water control additive may be present in an amount in the range of from about 0.1% to about 16% by weight of dry solids, for example. In alternative embodiments, the free water control additive may be present in an amount in the range of from about 0.1% to about 2% by weight of dry solids.

The cement slurry composition may further include a fluid-loss-control additive. A fluid-loss-control additive may decrease the volume of fluid that is lost to the subterranean formation. Examples of suitable fluid-loss-control additives include, but not limited to, certain polymers, such as hydroxyethyl cellulose, carboxymethylhydroxyethyl cellulose, copolymers of 2-acrylamido-2-methylpropanesulfonic acid and acrylamide or N,N-dimethylacrylamide, and graft copolymers including a backbone of lignin or lignite and pendant groups including at least one member selected from the group consisting of 2-acrylamido-2-methylpropane-sulfonic acid, acrylonitrile, and N,N-dimethylacrylamide, for example.

The cement slurry composition can include a source of hydroxide ions. The source of hydroxide ions can be any source of hydroxide ions suitable for use in a cement slurry composition. Some examples of sources of hydroxide ions may be compounds which release hydroxide when mixed with water, such as calcium hydroxide, or compounds which react with water or other compounds and release hydroxide ions such as Portland cement. Other sources of hydroxide ions may include, but are not limited to, hydrated lime, cement kiln dust, and lime kiln dust, for example.

The source of hydroxide ions may include hydrated lime. As used herein, the term "hydrated lime" will be understood to mean calcium hydroxide. In some examples, the hydrated lime may be provided as quicklime (calcium oxide) which hydrates when mixed with water to form the hydrated lime. The hydrated lime may be included in examples of the cement slurry compositions, for example, to form a hydraulic composition with a pozzolan or silica source. For example, the hydrated lime may be included in a pozzolan or silica source-to hydrated-lime weight ratio of about 10:1 to about 1:1 or a ratio of about 3:1 to about 5:1. Where present, the hydrated lime may be included in the cement slurry composition in an amount at a point in a range of from about 1% to about 40% by weight of the cement slurry composition, for example. In some examples, the hydrated lime may be present in an amount ranging between any of and/or including any of about 1%, about 10%, about 20%, about 30%, or about 40% by weight of the cement slurry composition.

Other additives (e.g., suitable for use in subterranean cementing operations) may also be included in examples of the cement slurry composition. Examples of such additives include, but are not limited to weighting agents, gas-generating additives, mechanical-property-enhancing additives, lost-circulation materials, filtration-control additives, defoaming agents, thixotropic additives, and combinations thereof. In examples, one or more of these additives may be added to the cement slurry composition prior to the placement of the cement slurry composition (e.g., into a wellbore).

In some examples, the cement slurry composition may set to have a desirable compressive strength. Compressive strength is generally the capacity of a material or structure to withstand axially directed pushing forces. The compressive strength may be measured at a specified time after the cement slurry composition has been maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength can be calculated from the failure load divided by the cross-sectional area resisting the load and is reported in units of pound-force per square inch (psi). Non-destructive methods may employ a USA™ ultrasonic cement analyzer, available from Fann Instrument Company, Houston, Tex. Compressive strength values may be determined in accordance with API RP 10B-2, Recommended Practice for Testing Well Cements, First Edition, July 2005. By way of example, the cement slurry composition may develop a 24-hour compressive strength in the range of from about 50 psi (345 kPa) to about 5000 psi (34474 kPa), alternatively, from about 100 psi (689 kPa) to about 4500 psi (31026 kPa), or alternatively from about 500 psi (3447 kPa) to about 4000 psi (27578 kPa). In some examples, the cement slurry composition may develop a compressive strength in 24 hours of at least about 50 psi (345 kPa), at least about 100 psi (689 kPa), at least about 500 psi (3447 kPa), or more. In some examples, the compressive strength values may be determined using destructive or non-destructive methods at a temperature ranging from 100° F. (38° C.) to 200° F. (93° C.).

The exemplary cement slurry compositions disclosed herein may be used in a variety of subterranean operations, including primary and remedial cementing. The cement slurry composition may be introduced into a wellbore and allowed to set therein, as described hereinbelow with reference to FIG. 5, which is a schematic illustration of an exemplary placement of a cement slurry composition into a wellbore annulus, according to embodiments of this disclosure. As used herein, introducing the cement slurry composition into a subterranean formation includes introduction into any portion of the subterranean formation, including, without limitation, into a wellbore drilled into the subterranean formation, into a near wellbore region surrounding the wellbore, such as a subterranean formation, or into both. In primary cementing, the cement slurry composition may be introduced into an annular space between a conduit located in a wellbore and the walls of a wellbore (and/or a larger conduit in the wellbore), wherein the wellbore penetrates the subterranean formation. The cement slurry composition may be allowed to set in the annular space to form an annular sheath of hardened cement. The cement slurry composition may form a barrier that prevents the migration of fluids in the wellbore. The cement slurry composition may also, for example, support the conduit in the wellbore. In remedial cementing, a cement slurry composition may be used, for example, in squeeze-cementing operations or in the placement of cement plugs. By way of nonlimiting example, the cement slurry composition may be placed in a wellbore to plug an opening (e.g., a void or crack) in the formation, in a gravel pack, in the conduit, in the cement sheath, and/or between the cement sheath and the conduit (e.g., a microannulus).

As described further hereinbelow with reference to FIG. 3, the components of the cement slurry composition may be combined in any order desired to form a cement slurry composition that can be placed into a subterranean formation. In addition, the components of the cement slurry compositions may be combined using any mixing device compatible with the cement slurry composition, including a bulk mixer, for example. In some embodiments, a cement slurry composition may be prepared by dry blending the solid components of the cement slurry composition at a bulk plant, for example, and thereafter combining the dry blend with water when desired for use. For example, a dry blend may be prepared that includes the dry cement components. Liquid additives (if any) can be combined with the water before the water is combined with the dry components or added directly to a mixer tub.

The method I/II can provide for an increased mass and/or volume capacity of $CO_2$ capture relative to a mass and/or volume capacity of $CO_2$ capture obtained via foam cementing employing a gaseous $CO_2$ at atmospheric pressure and/or chemical absorption methods of sequestering $CO_2$. In embodiments, the method I/II can provide for an increased amount (e.g., mass and/or volume) of C1 (e.g., components having a single carbon atom, such as methane) for carbon capture and storage (CCS) relative to an amount (e.g., mass and/or volume, respectively) of C1 for CCS obtained via foam cementing employing a gaseous $CO_2$ at atmospheric pressure and/or chemical absorption methods of sequestering $CO_2$. The mass and/or volume capacity of $CO_2$ capture relative to the volume capacity of $CO_2$ capture provided by the Method I can be from about 50 to about 1000, from about 100 to about 1000, from about 200 to about 500, or at least 10, 20, 30, 40, 50, 60, 70, 80, 90, 100, 200, 300, 400, 500, 600, 700, 800, 900, or 1000 times the mass and/or volume capacity of $CO_2$ capture, respectively, obtained via the foam cementing employing the gaseous $CO_2$ at atmospheric pressure and/or the chemical absorption methods of sequestering $CO_2$. The amount (e.g., mass and/or volume) of C1 for CCS relative to the amount of C1 for CCS provided by the Method I can be from about 50 to about 1000, from about 100 to about 1000, from about 200 to about 500, or at least 10, 20, 30, 40, 50, 60, 70, 80, 90, 100, 200, 300, 400, 500, 600, 700, 800, 900, or 1000 times the amount (e.g., mass and/or volume, respectively) of C1 for CCS obtained via the foam cementing employing the gaseous $CO_2$ at atmospheric pressure and/or the chemical absorption methods of sequestering $CO_2$.

The Method I/II of this disclosure provides for simultaneous curing of the cement slurry composition (e.g., downhole) and bulk storage of the entrained $CO_2$ in the hardened cement.

Also provided herein is a hardened foamed cement comprising: from about 5 to about 60, from about 40 to about 50, from about 45 to about 50, and/or greater than or equal to about 5, 10, 15, 20, 25, 30, 35, 40, 45, 50, 55, or 60 vol % $CO_2$ entrained per $m^3$ of the hardened foamed cement at conditions under which the $CO_2$ is supercritical. In embodiments, the hardened foamed cement is downhole.

Figure 3:
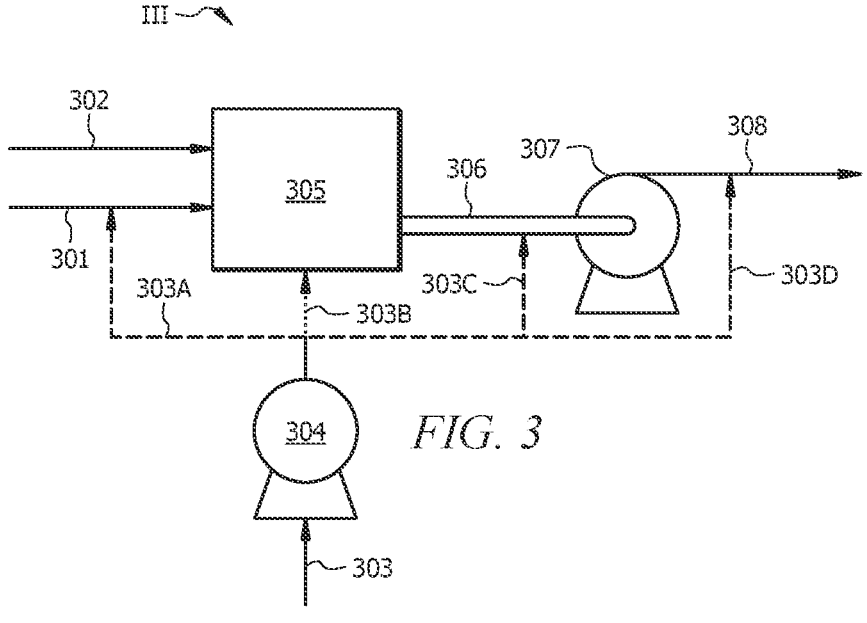
FIG. 3 is a schematic illustration of an exemplary system for the preparation and delivery of a cement slurry composition, according to embodiments of this disclosure.
Figure 4:
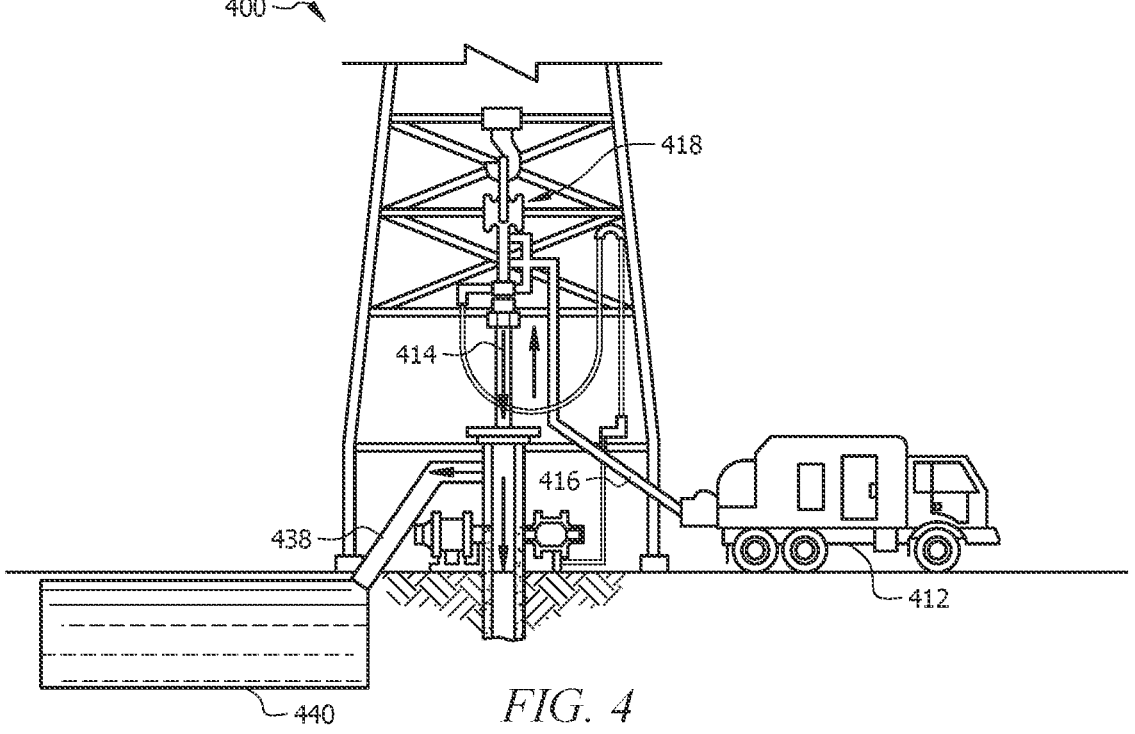
FIG. 4 is a schematic illustration of exemplary surface equipment that can be utilized in placement of a cement slurry composition to a final destination, such as a wellbore, according to embodiments of this disclosure.

Referring now to FIG. 3, the preparation of a cement slurry composition in accordance with example embodiments will now be described. FIG. 3 is a schematic illustration of a system III for the preparation of a cement slurry composition (e.g., a foamed cement composition) and subsequent delivery of the cement slurry composition to a final destination at which the cement slurry composition will be allowed to harden, for example, a wellbore. The cement slurry composition may be prepared according to any method disclosed herein such that the cement slurry composition remains in a pumpable fluid state for an extended period of time. As shown, the cement slurry composition may be mixed in mixing equipment 305, such as, without limitation, a jet mixer, re-circulating mixer, or a batch mixer, for example, and then pumped via pumping equipment 307 to a final destination, for example, a wellbore. In some embodiments, the mixing equipment 305 and the pumping equipment 307 may be disposed on one or more cement trucks. One or more lines 301/302 can be utilized to introduce water, cementitious materials, and additives to mixer 305. One or more lines 303 can be utilized to introduce the $CO_2$ into the cement slurry composition. In embodiments, a compressor 304 can be utilized to increase the pressure of the $CO_2$ in line 303, e.g., to provide liquid or supercritical $CO_2$. The $CO_2$ in $CO_2$ line 303 (optionally after compression in compressor 304) can be introduced into System III at a variety of locations. For example, in embodiments, $CO_2$, optionally after passage through compressor 304, is combined, via line 303A, with one or more components of the cement slurry composition in the one or more lines 301/302 prior to introduction into mixer 305. Alternatively or additionally, $CO_2$, optionally after passage through compressor 304, is introduced separately, via line 303B, into mixer 305. Alternatively or additionally, $CO_2$, optionally after passage through compressor 304, is introduced, via line 303C, into line 306 downstream of mixer 305 and upstream of pump 307. Alternatively or additionally, $CO_2$, optionally after passage through compressor 304, is introduced, via line 303D, into line 308 downstream of pump 307. In embodiments, the $CO_2$ in line 303, 303A, 303B, 303C, 303D, 306, or 308 is gaseous, liquid, or supercritical phase.

An example technique for placing the cement slurry composition into a subterranean formation will now be described with reference to FIGS. 4 and 5. FIG. 4 is a schematic illustration of surface equipment 400 that may be used in placement of a cement slurry composition in accordance with certain embodiments. It should be noted that while FIG. 4 generally depicts a land-based operation, those skilled in the art will readily recognize that the principles described herein are equally applicable to subsea operations that employ floating or sea-based platforms and rigs, without departing from the scope of the disclosure. As illustrated by FIG. 4, the surface equipment 400 may include a cementing unit 412, which may include one or more cement trucks. The cementing unit 412 may include mixing equipment 305 and pumping equipment 307 (e.g., as depicted in FIG. 3). The cementing unit 412 may pump a cement slurry composition 414 through a feed pipe 416 and to a cementing head 418 which conveys the cement slurry composition 414 downhole.

Figure 5:
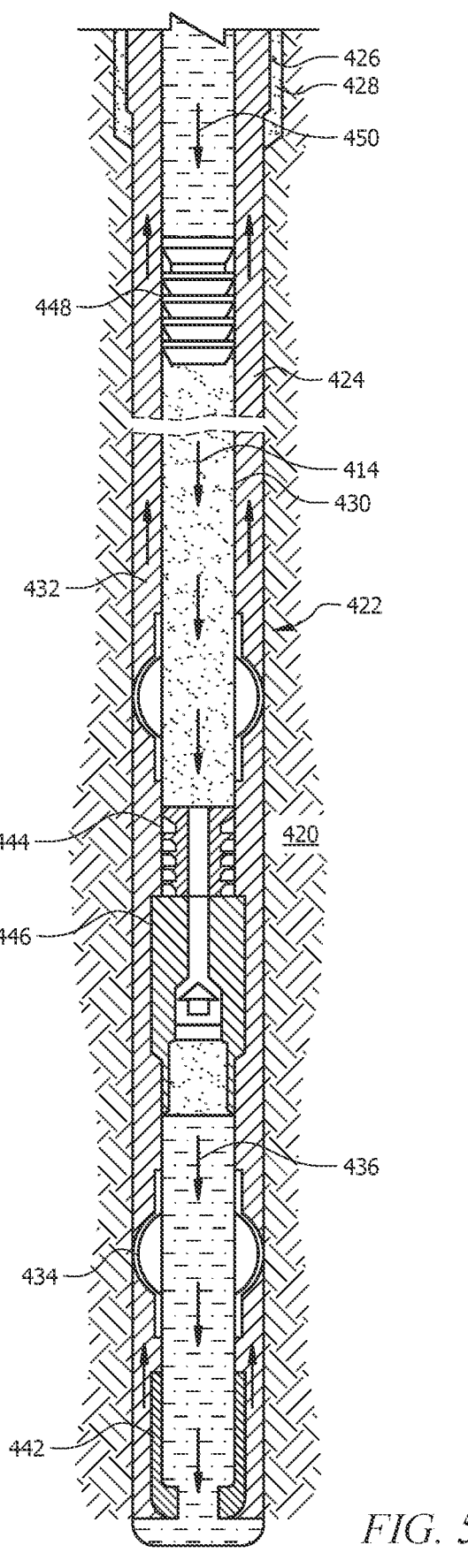
FIG. 5 is a schematic illustration of an exemplary placement of a cement slurry composition into a wellbore annulus, according to embodiments of this disclosure.

Turning now to FIG. 5, the cement slurry composition 414 may be placed into a subterranean formation 420 in accordance with example embodiments. As illustrated, a wellbore 422 may be drilled into the subterranean formation 420. While wellbore 422 is shown extending generally vertically into the subterranean formation 420, the principles described herein are also applicable to well bores that extend at an angle through the subterranean formation 420, such as horizontal and slanted wellbores. As illustrated, the wellbore 422 comprises walls 424. In the illustrated embodiment, a surface casing 426 has been inserted into the wellbore 422. The surface casing 426 may be cemented to the walls 424 of the wellbore 422 by cement sheath 428. In the illustrated embodiment, one or more additional conduits (e.g., intermediate casing, production casing, liners, etc.), shown here as casing 430 may also be disposed in the wellbore 422. As illustrated, there is a wellbore annulus 432 formed between the casing 430 and the walls 424 of the wellbore 422 and/or the surface casing 426. One or more centralizers 434 may be attached to the casing 430, for example, to centralize the casing 430 in the wellbore 422 prior to and during the cementing operation.

With continued reference to FIG. 5, the cement slurry composition 414 may be pumped down the interior of the casing 430. The cement slurry composition 414 may be allowed to flow down the interior of the casing 430 through a casing shoe 442 at the bottom of the casing 430 and up around the casing 430 into the wellbore annulus 432. The cement slurry composition 414 may be allowed to set in the wellbore annulus 432, for example, to form a cement sheath that supports and positions the casing 430 in the well bore 422. While not illustrated, other techniques may also be utilized for introduction of the cement slurry composition 414. By way of example, reverse circulation techniques may be used that include introducing the cement slurry composition 414 into the subterranean formation 420 by way of the wellbore annulus 432 instead of through the casing 430.

As it is introduced, the cement slurry composition 414 may displace other fluids 436, such as drilling fluids and/or spacer fluids that may be present in the interior of the casing 430 and/or the wellbore annulus 432. At least a portion of the displaced fluids 436 may exit the wellbore annulus 432 via a flow line 438 and be deposited, for example, in one or more retention pits 440 (e.g., a mud pit), as shown on FIG. 4.

Referring again to FIG. 5, a bottom plug 444 may be introduced into the wellbore 422 ahead of the cement slurry composition 414, for example, to separate the cement slurry composition 414 from the fluids 436 that may be inside the casing 430 prior to cementing. After the bottom plug 444 reaches the landing collar 446, a diaphragm or other suitable device should rupture to allow the cement slurry composition 414 through the bottom plug 444. In FIG. 5, the bottom plug 444 is shown on the landing collar 446. In the illustrated embodiment, a top plug 448 may be introduced into the wellbore 422 behind the cement slurry composition 414. The top plug 448 may separate the cement slurry composition 414 from a displacement fluid 450 and also push the cement slurry composition 414 through the bottom plug 444.

This method described herein provides a novel approach to carbon capture by intentionally foaming cement with $CO_2$ and allowing the $CO_2$ to be trapped in the cement matrix while potentially also providing strengthening, energized fluid properties, and density reduction. Via embodiments of this disclosure, $CO_2$ can be utilized rather than $N_2$ for foam cementing (e.g., as foaming gas).

Rather than simply treating cement/concrete with $CO_2$ to promote hardening, sequestration, etc., the herein disclosed methods can utilize the high pressure found in a wellbore to compress $CO_2$ whereby substantially more $CO_2$ (and/or C1 for CCS, for example, when the cement slurry composition includes methane) can be captured than can be done at atmospheric pressure or via conventional chemical absorption methods Under wellbore conditions, $CO_2$ will be supercritical (except possibly for at the surface or during transport downhole) and thus the capacity (e.g., mass and/or volume) of $CO_2$ capture can be increased by about 100 to 1000 times via embodiments of this disclosure relative to atmospheric treatment. Above about 88° F. (31° C.), $CO_2$ will be gas or supercritical but can be injected/entrained into the cement slurry composition, in embodiments, as a liquid to enhance mixing efficiency below 1071 psi. Previous research indicates that pure $CO_2$ has limited effect on the bulk cement, and calcite formation appears to be limited to the bubble structure likely due to the presence of water and the permeability reduction that occurs.

Some prior art cementing methods sequester small amounts of $CO_2$ by reaction to carbonate. Such prior art methods involve $CO_2$ curing rather than entrainment, which entrainment, as described herein, accomplishes the curing and bulk storage simultaneously, and provides much greater $CO_2$ sequestration.

Other advantages will be apparent to those of skill in the art and with the help of this disclosure.

EXAMPLES

The embodiments having been generally described, the following examples are given as particular embodiments of the disclosure and to demonstrate the practice and advantages thereof. It is understood that the examples are given by way of illustration and not intended to limit the specification or the claims in any manner.

Example 1

In this Example 1, a study was performed of the density of carbon dioxide under varying conditions. Table 1 provides density values for carbon dioxide under various conditions of temperature and pressure. In Table 1, "change from atmospheric" indicates the density change from normal conditions of normal temperature and pressure (i.e., a temperature of 20° C. and atmospheric pressure (i.e., 101.3 kPa)).

As can be seen in Table 1, increasing the pressure substantially increases the density relative to the density at normal temperature and pressure (as seen in the "change from atmospheric").

TABLE 1

| | Temperature | | | Pressure | | | Density [g/L] = | Density Change from |
|---|---|---|---|---|---|---|---|---|
| State | [K] | [° C.] | [° F.] | [MPa] | [bara] | [psia] | [kg/m$^3$] | atmospheric |
| Gas | 300 | 26.9 | 80.3 | 0.1 | 1 | 14.5 | 1.773 | |
| | 300 | 26.9 | 80.3 | 1 | 10 | 145 | 18.58 | 10.48 |
| Supercritical | 450 | 177 | 350 | 10 | 100 | 1450 | 131.6 | 74.22 |
| phase | 650 | 377 | 710 | 10 | 100 | 1450 | 82 | 46.25 |
| | 850 | 577 | 1070 | 10 | 100 | 1450 | 61.31 | 34.58 |
| | 1050 | 777 | 1430 | 10 | 100 | 1450 | 49.31 | 27.81 |
| Supercritical | 250 | −23.2 | −9.7 | 100 | 1000 | 14504 | 1236 | 697.12 |
| phase | 450 | 177 | 350 | 100 | 1000 | 14504 | 847 | 477.72 |
| | 650 | 377 | 710 | 100 | 1000 | 14504 | 601.9 | 339.48 |
| | 850 | 577 | 1070 | 100 | 1000 | 14504 | 468.1 | 264.02 |
| | 1050 | 777 | 1430 | 100 | 1000 | 14504 | 387 | 218.27 |

Data from Example 1

The methods of this disclosure enable a greater mass percent of $CO_2$ in the hardened cement (e.g., kg $CO_2$ per m$^3$ of hardened cement) relative to conventional methods, due to the increased density of the $CO_2$ under supercritical conditions.

Example 2

Figure 7:
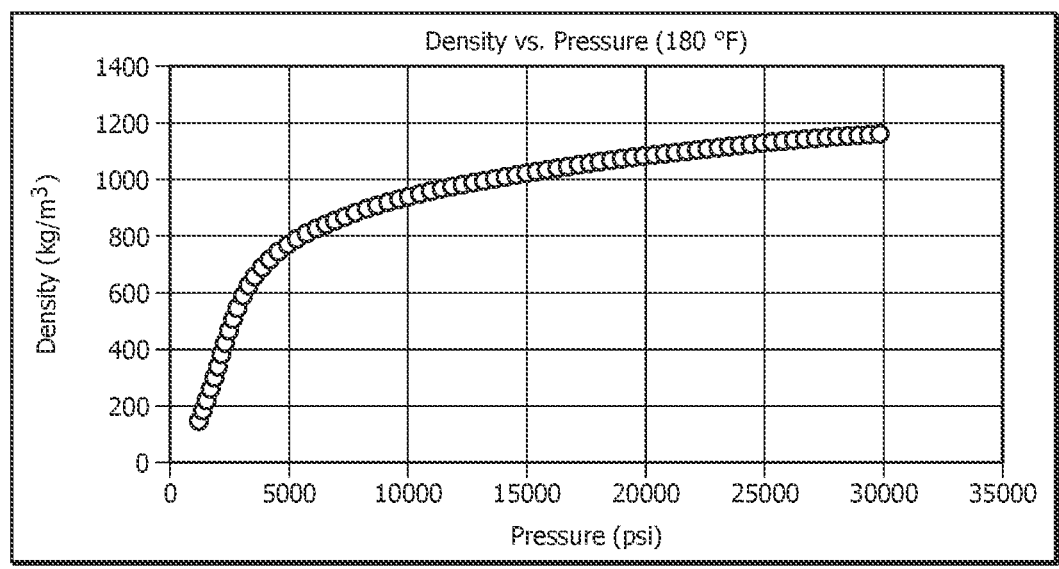
FIG. 7 is a plot of $CO_2$ density ($kg/m^3$) as a function of pressure (psia) at a temperature of 180° F. (82° C.), of Example 2.

The herein described compositions and methods provide that the pressures (e.g., downhole) enable compression of $CO_2$ and sequestration of an increased mass of $CO_2$ per unit volume of composition. Compared to ambient conditions, albeit the volumes may not be much different, the mass is very different. FIG. 7 is a plot of density (kg/m$^3$) of $CO_2$ as a function of pressure (psia) at a temperature of 180° F. (82° C.). For example, in a cement composition of this disclosure comprising 50% by volume $CO_2$ at 13,000 psi and 180° F., the $CO_2$ will have a specific density of about 1000 kg/m$^3$ and, if 50% of the volume is the $CO_2$, then 500 kg of $CO_2$ are captured per m$^3$ of the cement. By comparison, for a same example at atmospheric (14.5 psi) pressure, the $CO_2$ will be in the vapor phase and have a density of just 1.5 kg/m$^3$. Accordingly, the comparative cement could capture only 750 g of $CO_2$ per m$^3$ of the comparative cement.

ADDITIONAL DISCLOSURE

The following are non-limiting, specific embodiments in accordance with the present disclosure:

In a first embodiment, a method comprises: entraining carbon dioxide ($CO_2$) in a cement slurry composition and subjecting the cement slurry composition to conditions under which the $CO_2$ achieves and maintains a supercritical state; and allowing the cement slurry composition to harden to form a hardened cement having $CO_2$ sequestered therein.

A second embodiment can include the method according to the first embodiment, wherein subjecting the cement slurry composition to conditions under which the $CO_2$ achieves and maintains a supercritical state comprises positioning the cement slurry composition downhole at a wellsite.

A third embodiment can include the method according to any one of the first or second embodiments, wherein the cement slurry composition comprises from about 5 to 60, from about 40 to about 50, from about 45 to about 50, and/or greater than or equal to about 5, 10, 15, 20, 25, 30, 35, 40, 45, 50, 55, or 60 vol % $CO_2$ entrained therein at the conditions under which the $CO_2$ achieves and maintains the supercritical state.

A fourth embodiment can include the method according to any one the first to third embodiments, wherein the hardened cement contains therein from about 5 to 60, from about 40 to about 50, from about 45 to about 50, and/or greater than or equal to about 5, 10, 15, 20, 25, 30, 35, 40, 45, 50, 55, or 60 vol % $CO_2$ per m$^3$ of the hardened cement.

A fifth embodiment can include the method according to any one of the first to fourth embodiments, wherein the cement slurry composition further comprises water and one or more additional cement components.

A sixth embodiment can include the method according to any one of the first to fifth embodiments, wherein entraining carbon dioxide ($CO_2$) in the cement slurry composition under conditions whereby the $CO_2$ reaches the supercritical state comprises: combining liquid and/or gaseous $CO_2$ with the cement slurry composition and compressing such that the $CO_2$ becomes supercritical $CO_2$; and/or combining supercritical $CO_2$ with the cement slurry composition.

A seventh embodiment can include the method according to the sixth embodiment, wherein compressing such that the $CO_2$ becomes supercritical $CO_2$ occurs when the cement slurry composition and the liquid and/or gaseous $CO_2$ are placed downhole, whereby downhole pressure and temperature cause the liquid and/or gaseous $CO_2$ to become the supercritical $CO_2$.

An eighth embodiment can include the method according to any one of the first to seventh embodiments, wherein entraining the $CO_2$ in the cement slurry composition under conditions whereby the $CO_2$ achieves the supercritical state comprises combining a fluid stream comprising $CO_2$ with the cement slurry composition.

A ninth embodiment can include the method according to the eighth embodiment, wherein the fluid stream comprises a liquid or gaseous $CO_2$.

A tenth embodiment can include the method according to the eighth or ninth embodiments, wherein the fluid stream comprises $CO_2$ produced at a jobsite at which the method is performed.

An eleventh embodiment can include the method according to any one of the eighth to tenth embodiments, wherein the fluid stream comprises all or a portion of a gas comprising $CO_2$ (e.g., an exhaust gas, a produced gas, etc.).

A twelfth embodiment can include the method according to the eleventh embodiment further comprising: separating $CO_2$ gas from a gas comprising $CO_2$ (e.g., an exhaust gas, produced gas, etc.) produced at a wellsite.

A thirteenth embodiment can include the method according to the twelfth embodiment further comprising compressing the $CO_2$ gas to provide the liquid $CO_2$.

A fourteenth embodiment can include the method according to the thirteenth embodiment, wherein the compressing is effected with hydrocarbons (e.g., wellhead gas) recovered or produced at the wellsite.

A fifteenth embodiment can include the method according to any one of the eleventh to fourteenth embodiments, wherein the gas comprising $CO_2$ (e.g., exhaust gas, produced gas, etc.) further comprises nitrogen ($N_2$), carbon monoxide (CO), hydrogen sulfide ($H_2S$), water vapor, hydrocarbons ($C_xH_y$), nitrogen oxides ($NO_x$), particulate matter, or a combination thereof.

A sixteenth embodiment can include the method according to any one of the first to fifteenth embodiments, wherein the cement slurry composition is a foamed cement slurry comprising a base slurry, one or more foaming agents, one or more foam stabilizers, accelerators, set retarders, fluid loss control agents, or a combination thereof.

A seventeenth embodiment can include the method according to any one of the first to sixteenth embodiments, wherein the method provides for an increased mass and/or volume capacity of $CO_2$ capture (and/or an increased amount of C1 for carbon capture and storage (CCS)) relative to a mass and/or volume capacity of $CO_2$ capture (and/or an amount of C1 for carbon capture and storage (CCS)) obtained via foam cementing employing a gaseous $CO_2$ at atmospheric pressure and/or chemical absorption methods of sequestering $CO_2$.

An eighteenth embodiment can include the method according to any one of the first to seventeenth embodiments, wherein the cement slurry composition further comprises methane.

A nineteenth embodiment can include the method according to the eighteenth embodiment further comprising capturing methane in a wellhead gas and incorporating the methane gas into the cement slurry composition.

A twentieth embodiment can include the method according to any one of the seventeenth to nineteenth embodiments, wherein the mass and/or volume capacity of $CO_2$ capture (and/or the amount of C1 for carbon capture and storage (CCS)) relative to the mass and/or volume capacity of $CO_2$ capture (and/or the amount of C1 for carbon capture and storage (CCS)), respectively, provided by the method is from about 50 to about 1000, from about 100 to about 1000, from about 200 to about 500, or at least 10, 20, 30, 40, 50, 60, 70, 80, 90, 100, 200, 300, 400, 500, 600, 700, 800, 900, or 1000 times the mass and/or volume capacity of $CO_2$ capture (and/or the amount of C1 for carbon capture and storage (CCS)) obtained via the foam cementing employing the gaseous $CO_2$ at atmospheric pressure and/or the chemical absorption methods of sequestering $CO_2$.

A twenty first embodiment can include the method according to any one of the first to twentieth embodiments, wherein the method provides for simultaneous curing of the cement slurry composition downhole and bulk storage of the entrained $CO_2$ in the hardened cement.

A twenty second embodiment can include the method according to any one of the first to twenty first embodiments, wherein the conditions comprise a temperature of greater than or equal to about 87.8° F. (31° C.) and a pressure of greater than or equal to about 1070 psi (7.3 MPa).

A twenty third embodiment can include the method according to the twenty second embodiment, wherein the conditions comprise a temperature of greater than about 100° F. (37.7° C.) and a pressure of greater than or equal to about 1070 psi (7.3 MPa).

In a twenty fourth embodiment, a method comprises: forming a foamed cement composition comprising carbon dioxide ($CO_2$), wherein the $CO_2$ is in a supercritical state; and allowing the foamed cement composition to cure under conditions at which the $CO_2$ remains supercritical, to provide a hardened cement.

A twenty fifth embodiment can include the method according to the twenty second embodiment, wherein forming the foamed cement composition comprises adding to a base cement slurry: (i) non-supercritical $CO_2$ (e.g., gaseous $CO_2$) and/or (ii) a non-$CO_2$ foaming agent (e.g., another gas).

A twenty sixth embodiment can include the method according to the twenty fourth embodiment, wherein forming the foamed cement composition comprises adding liquid $CO_2$ to the base cement slurry and reducing the pressure to obtain gaseous $CO_2$ to provide the foamed cement composition, and increasing the pressure to convert remaining $CO_2$ in the foamed cement composition to supercritical.

A twenty seventh embodiment can include the method according to any one of the twenty fourth to twenty sixth embodiments, wherein allowing the foamed cement composition to cure under the conditions at which the $CO_2$ remains supercritical comprises positioning the foamed cement composition downhole.

A twenty eighth embodiment can include the method according to any one of the twenty fourth to twenty seventh embodiments, wherein the conditions comprise a temperature of greater than or equal to about 87.8° F. (31° C.) and/or a pressure of greater than or equal to about 1070 psi (7.39 MPa).

A twenty ninth embodiment can include the method according to any one of the twenty fourth to twenty eighth embodiments, wherein the hardened cement contains therein from about 5 to 60, from about 40 to about 50, from about 45 to about 50, and/or greater than or equal to about 5, 10, 15, 20, 25, 30, 35, 40, 45, 50, 55, or 60 vol % $CO_2$ per $m^3$ of the hardened cement at the conditions.

A thirtieth embodiment can include the method according to any one of the twenty fourth to twenty ninth embodiments, wherein the foamed cement composition comprises from about 5 to 60, from about 40 to about 50, from about 45 to about 50, and/or greater than or equal to about 5, 10, 15, 20, 25, 30, 35, 40, 45, 50, 55, or 60 vol % $CO_2$ entrained therein at the conditions at which the $CO_2$ remains supercritical.

In a thirty first embodiment, a hardened foamed cement comprises therein from about 5 to 60, from about 40 to about 50, from about 45 to about 50, and/or greater than or equal to about 5, 10, 15, 20, 25, 30, 35, 40, 45, 50, 55, or 60 vol % $CO_2$ per $m^3$ of the hardened foamed cement.

A thirty second embodiment can include the hardened foamed cement of the thirty first embodiment, wherein the hardened foamed cement is downhole.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

What is claimed is:

1. A hardened foamed cement comprising from about 40 to 60 vol % of supercritical $CO_2$ per $m^3$, wherein the hardened foamed cement is produced by:

entraining carbon dioxide ($CO_2$) in a cement slurry composition and subjecting the cement slurry composition to conditions under which the entrained $CO_2$ achieves and maintains a supercritical state;

introducing the cement slurry composition comprising the entrained $CO_2$ in the supercritical state downhole at a wellsite; and allowing the cement slurry composition to harden to form the hardened foamed cement having the entrained $CO_2$ sequestered in the supercritical state therein, wherein the cement slurry composition in which the $CO_2$ is entrained comprises a cementitious material and water, and wherein the cementitious material consists of a Portland cement, a pozzolana cement, a gypsum cement, an alumina based cement, or a combination thereof.

2. The hardened foamed cement of claim 1, wherein the hardened foamed cement is downhole.

3. The hardened foamed cement of claim 1, wherein the cementitious material consists of the Portland cement.

4. The hardened foamed cement of claim 1, wherein entraining $CO_2$ in the cement slurry composition and subjecting the cement slurry composition to conditions under which the entrained $CO_2$ achieves and maintains the supercritical state comprises:

combining liquid $CO_2$ and/or gaseous $CO_2$ with the cement slurry composition and compressing such that the $CO_2$ becomes supercritical $CO_2$; and/or combining supercritical $CO_2$ with the cement slurry composition.

5. The hardened foamed cement of claim 1, wherein entraining the $CO_2$ in the cement slurry composition comprises combining a fluid stream comprising $CO_2$ with the cement slurry composition.

6. The hardened foamed cement of claim 5, wherein the fluid stream comprises a liquid or gaseous $CO_2$.

7. The hardened foamed cement of claim 6, wherein the fluid stream comprises $CO_2$ produced at a jobsite at which the hardened foamed cement is formed.

8. The hardened foamed cement of claim 5, wherein the fluid stream comprises all or a portion of an exhaust gas, a produced gas, methane, or a combination thereof.

9. The hardened foamed cement of claim 8, wherein the fluid stream comprises all or the portion of the produced gas obtained from the jobsite.

10. The hardened foamed cement of claim 1, wherein the cement slurry composition is a foamed cement slurry comprising a base slurry, one or more foaming agents, one or more foam stabilizers, accelerators, set retarders, fluid loss control agents, or a combination thereof.

11. The hardened foamed cement of claim 1, comprising from about 40 to about 50 vol % supercritical $CO_2$ per $m^3$ of the hardened foamed cement.

12. The hardened foamed cement of claim 11 comprising from about 45 to about 50 vol % supercritical $CO_2$ per $m^3$ of the hardened foamed cement.

13. The hardened foamed cement of claim 1, wherein the cementitious material consists of the Portland or pozzolana cement.

14. The hardened foamed cement of claim 1, wherein the cementitious material consists of the pozzolana cement.

15. The hardened foamed cement of claim 1, wherein the cementitious material consists of the gypsum cement.

16. The hardened foamed cement of claim 1, wherein the cementitious material consists of the alumina based cement.

17. The hardened foamed cement of claim 1 having an increased mass capacity of $CO_2$ capture relative to a mass capacity of $CO_2$ capture obtained via foam cementing employing a gaseous $CO_2$ at atmospheric pressure and/or chemical absorption methods of sequestering $CO_2$.

18. The hardened foamed cement of claim 1, comprising from about 50 to 60 vol % $CO_2$ per $m^3$ of the hardened foamed cement.

19. The hardened foamed cement of claim 1 comprising from about 10 kg to 100 kg of supercritical $CO_2$ per $m^3$ of the hardened foamed cement.

20. A system comprising: a conduit disposed in a wellbore penetrating a subterranean formation and the hardened foamed cement of claim 1 positioned within an annular space between the conduit and the wellbore.

* * * * *